Figure 1:
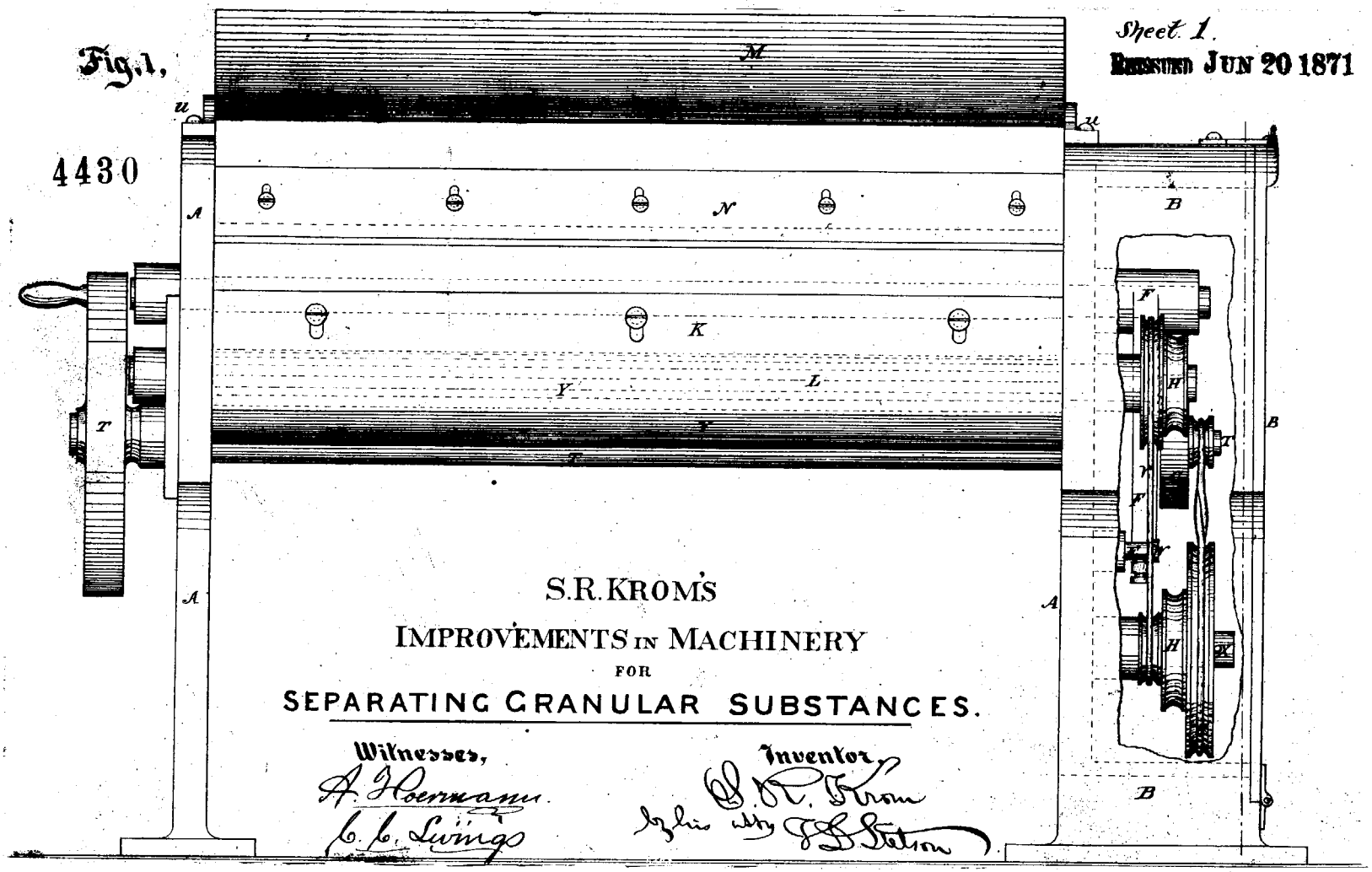

4430

Sheet 1.

Reissued Jun 20 1871

S. R. KROM'S

IMPROVEMENTS IN MACHINERY

FOR

SEPARATING GRANULAR SUBSTANCES.

Witnesses,

A. Hoermann

C. C. Livings

Inventor,

S. R. Krom by his Atty J. B. Stetson

Sheet 2.
Fig. 2,
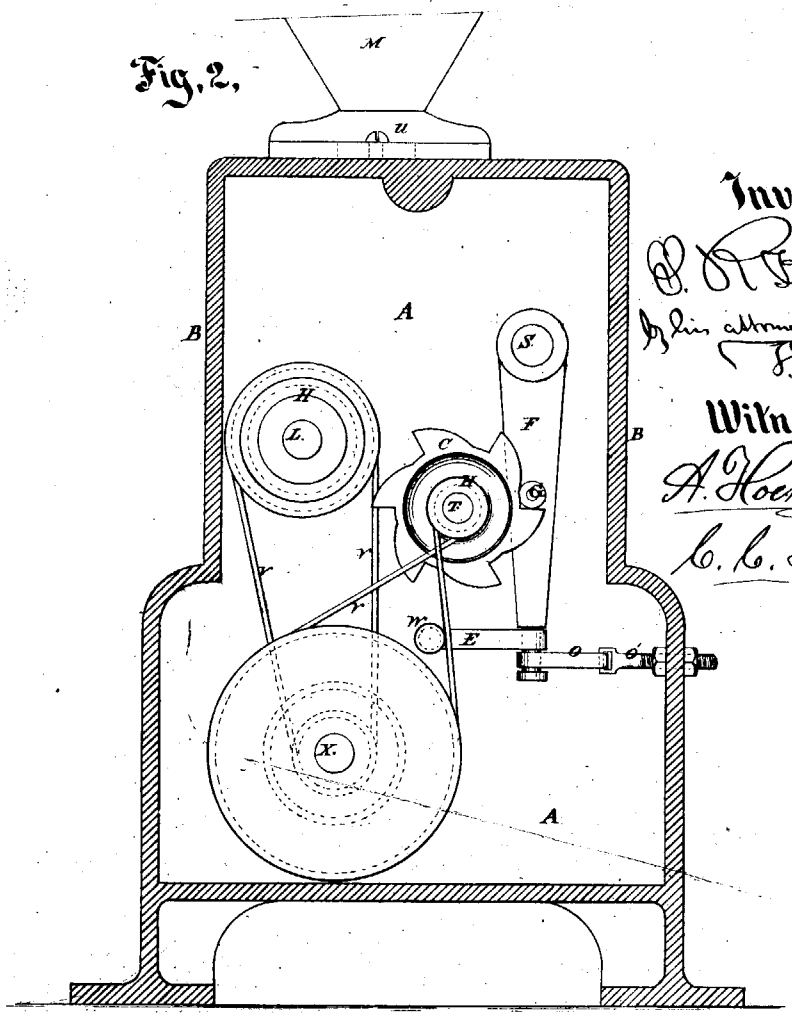
Fig. 3,
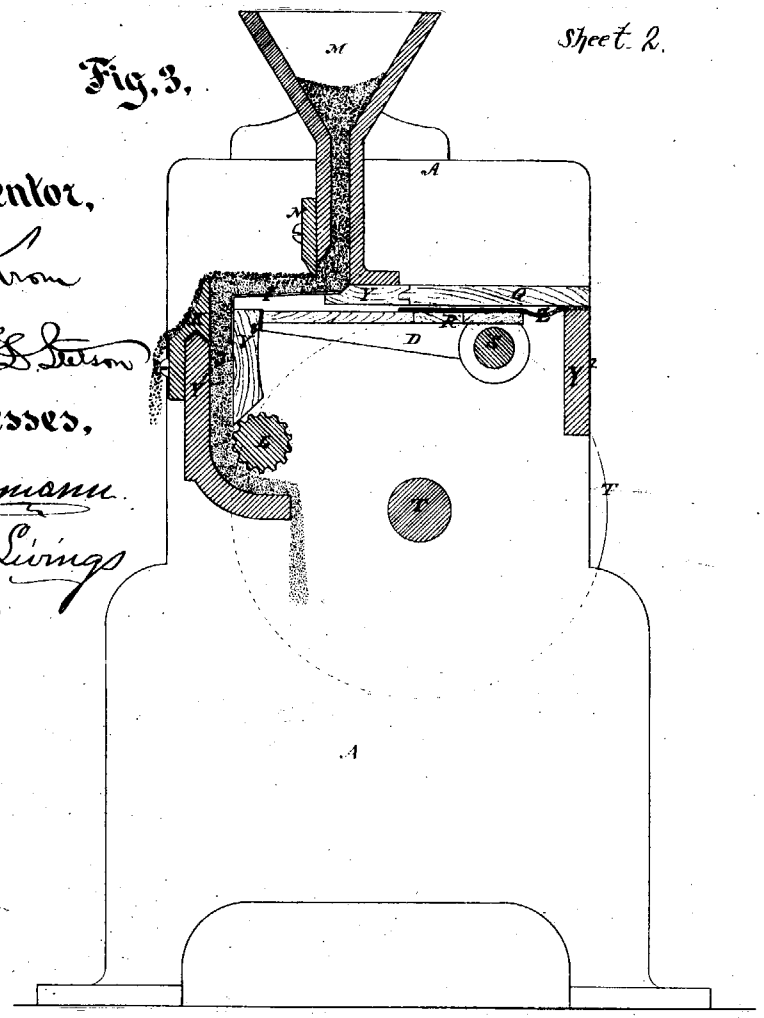
Inventor,
C. A. Thom
by his attorney
F. S. Stetson
Witnesses,
A. Hoermann
C. C. Livings

UNITED STATES PATENT OFFICE.

STEPHEN R. KROM, OF NEW YORK, N. Y.

IMPROVEMENT IN MACHINES FOR SEPARATING ORES.

Specification forming part of Letters Patent No. 81,794, dated September 1, 1868; antedated August 5, 1868; reissue No. 3,182, dated November 3, 1868; reissue No. 4,430, dated June 20, 1871.

*To all whom it may concern:*

Be it known that I, STEPHEN R. KROM, of the city and county of New York, in the State of New York, have invented certain new and useful Improvements in Machines for Separating Ores and other Granular Substances having different specific gravities; and I do hereby declare that the following is a full and exact description thereof.

My machine uses intermittent jets or puffs, which agitate the granular matter on the perforated bed and allow it in moving forward thereon to separate by the difference in specific gravity, the heavier masses sinking and the lighter rising under the peculiar conditions thus induced.

My machine also discharges the lighter material over a dam or obstruction into one vessel or receptacle, while the heavy material is conducted down into another, and is discharged from such other passage slowly, holding the passage always filled to hold back a proper accumulation of material at the top.

All these above-named features have been before known and approved.

My invention relates to details of mechanism by which I increase the efficiency of the machine with a given expenditure of power and a given area of perforated bed, and by which I am able to act with the highest degree of efficiency with varying speeds of the machine and am also able to better protect the mechanism from dust, &c., and to better regulate or graduate the discharge of the material.

In the course of my experiments I have found that increasing the suddenness of the upward stroke of the bellows, and bringing the ore of the ore-bed very close to such bed, or, as I prefer to term it, in an under current, has the effect to avoid the necessity for a great length of the perforated bed.

I am able to separate the ore or other granular material on a very short length, and, consequently, can, with a given area of space occupied by the machine, greatly increase what may be termed the width of the ore-bed, so that its width, considered relatively to the motion of the granular matter thereon, is much greater than its length.

I will first proceed to describe what I consider the best means of carrying out my invention, and will afterward designate the points which I believe to be new therein.

The accompanying drawing forms a part of this specification.

Figure 1 is a front view of the machine, with a portion of the casing broken away to exhibit the inclosed machinery. Fig. 2 is a vertical section, showing an end view of the said inclosed machinery. Fig. 3 is a vertical section through the center of the length of the machine.

Similar letters of reference indicate like parts in all the figures.

A A is a fixed frame-work, carrying the different working and other parts of the machine. B is a closed box to cover the different working parts.

The relations of the mechanism will be tolerably apparent from the drawing.

C is a trip-wheel. D is a device for giving intermittent puffs of air or water, and which is here shown as of bellows-form. S is said bellows-shaft or rocking-shaft. E is a rubber strap or spring. F is an arm which takes hold of the bellows-shaft S. This arm carries a pin, against which the trip-wheel acts. H H are pulleys to give a comparatively slow motion to a rich ore-delivery or discharging device, and which is here represented as a corrugated roller, L. I is the sieve or ore-bed. J is the channel for rich ore or the heaviest granulated matter to flow slowly down. N is the gate to regulate the delivery of ore on the sieve I. K is a gate to regulate the depth of ore on the ore-bed and the overflow of tailings. M is the hopper in which to introduce the ore or other granular material to be separated. T is the trip-shaft. X is a pin for one of the pulleys to revolve on. $Y^1$ $Y^2$ are the front and rear plates or sides of the fixed frame-work. R is the valve-passage or induction-aperture, which receives the air into the space above the bellows D. Z is a piece of soft leather or other tight and flexible material, which forms the flap or valve for the passage R, and also prevents the escape of air at the rear of the bellows. The front of the bellows is made to run in nearly air-tight contact with the hollow rear face of the longitudinal piece $Y^3$.

The screws and other means for connecting and adjusting the parts will be understood by good mechanics from the drawing without prolonged description.

The machine is operated as follows: Ore being placed in the hopper M, and the mechanism being set in motion, as each projection on the trip-wheel C comes in contact with the pin on the lever F said lever is thrown back and the bellows D is carried down. The moment the projection on the trip-wheel passes the pin on the lever F, the rubber or other kind of spring E, which connects the lever F with the fixed pin W, quickly carries the lever and bellows back to their original position. At each revolution of the trip-wheel C this operation is repeated so many times as there are teeth or projections on the trip-wheel. Each upward movement of the bellows forces the air above through the sieve, and agitates the ore lying thereon.

I have represented the ore by large and small dots in the drawing, the small being the heavy and the large the light grains; but it will be understood that the sizes do not really differ necessarily or usually, but only that this mode of representation is adopted to distinguish them.

Each puff of air tends to lift the lighter portion to the surface and allow the heavier portion to sink to the bottom. The lighter portion is thrown to the surface and carried forward over the gate K, while the heavy or rich ore works forward to the opening or channel J, where it sinks as fast as room is made by the displacement of ore at the bottom of this channel. This displacement is regulated by means of the slowly-revolving roller L. The separation takes place principally at the point where the ore is delivered from the hopper on the ore-bed I.

It will be seen that I deliver the ore on the bed in the form of a thin stream, and in the relation of an under current to that lying on the ore-bed, so that the tailings or light portion have but a short distance to traverse upward to become separated from the heavy portion, and the heavy portion has no distance to sink, because it enters near the surface of the ore-bed. By this feature, combined with the quick or sharp puffs of air, obtained in the manner just described, I am able to use a very short traverse of the ore across the bed.

I have found four hundred puffs of air per minute nearly what is required for the best work. More can be given without injury.

It is necessary that the parts which move at so rapid a rate should be as light as possible, and made in such a manner as will insure the greatest durability.

By reducing my ore-bed I reduce correspondingly my bellows. Instead of a large moving bellows I use a small one, and I separate on my short bed very effectually.

Another advantage I obtain in reducing the weight of the moving parts is less vibration or shake of the machine and less noise. Vibration tends to cause the heavy part of the ore to shift either to one side or the other, thus uncovering the opening for the delivery of the rich ore, or by reason of the bed being more covered on one side than the other the air tends to escape all on the side least exposed. In order to work successfully the machine should stand steady.

If the action of the puffs of air on the ore is not counteracted by any vibration of the machine the ore will be evenly distributed over the entire bed. The simple action of air on the ore in gentle puffs will very evenly distribute the ore on the bed, although very uneven before the puffs of air are given. The air will counteract some shake of the machine, and in my machine no serious effect from shake is experienced.

My mode of working the bellows, by the trip-wheel C and spring E, is better than any before known, because I can by its means get a uniform quick upward movement of the bellows, and, consequently, a just sufficiently vigorous puff of air, whether the machine runs faster or slower than its usual speed. I usually prefer to obtain at least four hundred and twenty puffs of air through the ore per minute. If I put more projections on the trip-wheel C, then I may run the trip-wheel at a lower speed; but I consider it better to run at this speed for the sake of the steady motion the momentum will give, and the speed of seventy revolutions does not strike the projections on the trip-wheel so hard as to make this speed objectionable. The rubber or other spring E is an important feature of my machine to carry back the bellows, not only on account of the quick manner in which it acts, but each upward stroke is precisely alike, so producing puffs of air of equal force at each upward movement of the bellows. No matter what may be the speed of the trip-wheel, whether fast or slow, the puff of air is the same or thereabout. In using the cam or crank as used in former machines no such results can be obtained, because if the cam or crank moves slowly the bellows must move correspondingly slow, and when the speed greatly slackens no adequate effect is produced on the ore. I connect the discharging-roller L with the main shaft which carries the trip-wheel C, so that if the trip-wheel revolves slowly, and the bellows give but few puffs of air through the ore per minute, and consequently less ore is separated per minute, the corrugated discharge-roller L drags less from the channel J. Each part thus keeps time with the other, so the speed may be varied from fast to slow, and the only effect produced will be the treatment of more or less ore. This is an important feature of my invention—namely, the working in concert, so that when one slackens the other slackens, and vice versa, of the discharging device to the rich ore or heavier particles, and device for producing intermittent puffs to the ore or other granular substance on the seive or bed I. This will readily be perceived, when it is considered that the separation is effected by the one device which produces intermittent puffs, it is necessary, in order to secure the passage for the rich ore from the bed being kept filled, that the discharging device at the bottom of said passage should move in timely concert with the separating device.

It will be obvious that the various arrangements of shafts and pulleys or other driving appliances may be employed to produce this working in concert of the separating and discharging devices; but the direct arrangement of bands and pulleys shown in the drawing is preferred, especially where the machine is designed to be worked by hand. As the richness of ore varies, and the proportion of rich ore is greater or lesser, the speed of the roller L must be regulated accordingly. I have provided different speeds on the pulleys for this purpose, the functions of which, in this combination, I esteem very important, and the construction and arrangement of which will be readily understood from the drawing. Ores also vary in gravity, and it is therefore necessary to vary the strength of the puffs of air for different qualities of ore. I provide means to accomplish this result in the use of the leather strap O and graduated fastening O'.

It will be understood that by holding the lever F back to a greater extent by the strap O the trip-wheel C does not move the lever F through so great a space as when allowed to move the full depth of the projection on the trip-wheel. By this means I can regulate the force of air acting on the ore to suit different gravities. Other means than the leather strap O can be employed to catch the lever; but I prefer this because it makes little noise. The gate N regulates the delivery of ore to the bed, and the gate K regulates the depth of ore lying on the bed. In treating different ores I find they require different thicknesses of stratums. The inclosed box B contains the principal working parts and protects them from grit and dirt. A very long use of my trip-wheel C does not interfere with the perfect working of the machine, because the projections are made long enough to admit of considerable wear.

Instead of making my opening for ore and overflow for tailings across the machine I arrange them lengthwise of the structure, as represented. Whatever difference there is in the length of the opening, so much is the capacity of the machine varied. For example, the width of a working machine, as previously constructed, was about one foot, and the delivery corresponded to this width. I prefer to make the working machine here described from four to six feet long; and the capacity of this machine is from four to six times as great as those before known, and the amount of sieve-surface to do this greater amount of separation of ore is only one-fourth (¼) as much, and, as before stated, the amount of power required is greatly diminished. By employing a bellows hinged on the shaft S, instead of working directly up and down, I not only get an easy movement, but am enabled to operate it with few parts and by very simple devices. By placing the working parts C, F, &c., at the end of the machine I am enabled to inclose the principal working parts in a tight box or case, B, without additional frame-work.

Having now fully described my invention, what I claim as new in separating-machines, and desire to secure by Letters Patent, is as follows:

1. Introducing the material upon the bed I in a thin stratum close to the surface of the bed, substantially in the manner and for the purposes herein set forth.

2. Traversing the material across the perforated bed I transversely to the length of the machine—that is to say, extending the bed I longitudinally of the length of the frame-work A, and causing the material to traverse across its narrowest dimensions, substantially as and for the purpose herein set forth.

3. In combination with a perforated separating-bed and a device for producing intermittent puffs to effect the separation of the granular substance on the bed, a rotating or traveling delivery device, arranged to regulate the discharge from the passage which carries off the heavier grades or particles passed below the separating-bed, substantially as specified.

4. The positive discharging means L $Y^1$ or their equivalents, controlling the discharge of the heavy material from a separating-bed by a positive motion, as specified.

5. The roller L, arranged and operating as represented relatively to the discharge-passage J, for the purposes herein set forth.

6. So gearing the mechanism or devices which induce the intermittent puffs, and the device which regulates the discharge of the heavier material, that said devices are made to work at certain determined velocities to each other during all variations in the general speed of the machine, essentially as and for the purpose herein set forth.

7. In combination, the ore-bed I with its feeding and discharge devices, the adjustable oscillating bellows D, the trip-wheel C and its connections, and suitable means for varying the rate of discharge through the passage J, all arranged for joint operation, substantially as and for the purposes herein set forth.

8. In combination with the perforated bed I, and with means for introducing and removing the material, as specified, the bellows D, mounted on a rocking-shaft, S, and operated by an adjustable vibrating motion, substantially as and for the purposes herein specified.

9. The trip-wheel C, arranged and operating, relatively to the bellows D and to the perforated bed I and its connections, as and for the purposes herein set forth.

10. The spring E, arranged and operating, relatively to the intermittent puffing means D and the bed I and the hopper M, so as to puff the air suddenly through the bed with the same velocity at all speeds of the machine, as herein set forth.

11. The lever F and roller or striking-pin G, arranged, as shown, on the shaft S, distinct from the bellows D, so as to allow the action of the trip-wheel C, or its equivalent, to cause a positive motion of the bellows D in one direction and allow the automatic action of the spring E to carry it suddenly in an opposite direction, as specified.

12. The adjustable gates N and K, or either of them, so arranged as to allow the separate changes in the thickness of the stratums on the ore-bed I and the rate of delivery from the hopper M, substantially as and for the purposes herein set forth.

13. The within-described arrangement of the operating parts C F and their connections at the end of the frame-work A, so that they may operate by a direct connection through the rocking-shaft S with the bellows D, and that the closed end of the frame A shall form one entire side of an inclosing-case to protect the working mechanism, all as and for the purposes herein set forth.

14. The flexible strap O and graduating fastening O′, arranged, as shown, relatively to each other and to the lever F and roller G, or their equivalents, so as to regulate the extent of the motion of the bellows and to arrest its motion noiselessly, as specified.

In testimony whereof I have hereunto affixed my name in presence of two subscribing witnesses.

S. R. KROM.

Witnesses:
C. C. LIVINGS,
A. HOERMANN.